United States Patent
Zhu et al.

(10) Patent No.: US 12,039,237 B1
(45) Date of Patent: Jul. 16, 2024

(54) SYSTEMS AND METHODS OF SIMULATING PRELOAD IN FASTENERS UNDERGOING ROTATION

(71) Applicant: ANSYS, Inc., Canonsburg, PA (US)

(72) Inventors: Yongyi Zhu, Venetia, PA (US); Chandra Shekhar Thakur, Maharashtra (IN)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/984,558

(22) Filed: Aug. 4, 2020

Related U.S. Application Data

(60) Provisional application No. 62/958,408, filed on Jan. 8, 2020.

(51) Int. Cl.
*G06F 30/23* (2020.01)
*G06F 111/10* (2020.01)

(52) U.S. Cl.
CPC .......... *G06F 30/23* (2020.01); *G06F 2111/10* (2020.01)

(58) Field of Classification Search
CPC ...... G06F 30/23; G06F 2111/10; G06F 30/20; G06F 30/25; G06F 30/367; G06F 30/398; G06F 30/27; G06F 30/28
See application file for complete search history.

(56) References Cited

U.S. PATENT DOCUMENTS

| | | | | |
|---|---|---|---|---|
| 5,024,496 A | * | 6/1991 | Oikawa ................. | G02B 5/09 359/218.1 |
| 5,920,491 A | * | 7/1999 | Hibbitt .................. | G06F 30/23 703/2 |
| 2012/0316853 A1 | * | 12/2012 | Looney ................. | G06F 30/23 703/7 |
| 2018/0181691 A1 | * | 6/2018 | Pedersen .............. | G06F 30/23 |

OTHER PUBLICATIONS

Vincent Rafik, Alain Daidié, Bertrand Combes. Numerical study of the screw-nut movement in the self-loosening process under transverses loading. 15e colloque national AIP-PRIMECA, 2017, Plagne-Montalbert, France. (Year: 2017).*

Chen et al. Self-Loosening Failure Analysis of Bolt Joints under Vibration considering the Tightening Process, Hindawi Shock and Vibration vol. 2017, Article ID 2038421, 15 pages (Year: 2017).*

(Continued)

*Primary Examiner* — Michael Edward Cocchi
(74) *Attorney, Agent, or Firm* — Jones Day

(57) ABSTRACT

Data characterizing a fastener and a preload condition applied to the fastener are received in a computer system. A model representing a mechanism coupling a first portion and a second portion of the fastener is created. The first portion and the second portion are located respectively at either end of the fastener along a longitudinal axis of the fastener. The first portion and the second portion are axially displaceable along the axis towards each other via the mechanism and rotatably displaceable about the axis relative to each other via the mechanism. The model includes relative axial displacement and/or relative torsional displacement between (Continued)

the first portion and the second portion corresponding to the preload condition. Physical behaviors of the fastener applied with the preload condition is simulated based on the model.

19 Claims, 16 Drawing Sheets

(56) References Cited

OTHER PUBLICATIONS

He et al., Experimental Study on the Tensile Performance of High-strength Blind-bolted T-stub with Endplate Tapping, Journal of Engineering Science and Technology Review 11 (5) (2018) 109-118 (Year: 2018).*

Korolo et al, The Guidelines for Modelling the Preloading Bolts in the Structural Connection Using Finite Element Methods, Hindawi Publishing Corporation, Journal of Computational Engineering vol. 2016, Article ID 4724312, 8 pages (Year: 2016).*

Lang, Lisa A., et al. "Finite element analysis to determine implant preload." The Journal of prosthetic dentistry 90.6 (2003): 539-546. (Year: 2003).*

Todd, Michael D., et al. "Nonlinear excitation and attractor mapping for detecting bolt preload loss in an aluminum frame." Health Monitoring and Smart Nondestructive Evaluation of Structural and Biological Systems III. vol. 5394. SPIE, 2004. (Year: 2004).*

Dinger, G., and C. Friedrich. "Avoiding self-loosening failure of bolted joints with numerical assessment of local contact state." Engineering failure analysis 18.8 (2011): 2188-2200. (Year: 2011).*

Qin, Zhaoye, Qinkai Han, and Fulei Chu. "Bolt loosening at rotating joint interface and its influence on rotor dynamics." Engineering Failure Analysis 59 (2016): 456-466. (Year: 2016).*

Abid, Muhammad, et al. "Optimized bolt tightening strategies for gasketed flanged pipe joints of different sizes." International journal of pressure vessels and piping 139 (2016): 22-27. (Year: 2016).*

Liu, Longquan, et al. "Combined and interactive effects of interference fit and preloads on composite joints." Chinese Journal of Aeronautics 27.3 (2014): 716-729. (Year: 2014).*

Gray, P. J., and C. T. McCarthy. "A global bolted joint model for finite element analysis of load distributions in multi-bolt composite joints." Composites Part B: Engineering 41.4 (2010): 317-325. (Year: 2010).*

* cited by examiner

SYSTEMS AND METHODS OF SIMULATING PRELOAD IN FASTENERS UNDERGOING ROTATION

CROSS-REFERENCE TO RELATED APPLICATIONS

This application claims benefits of U.S. Provisional Patent Application Ser. No. 62/958,408 for "Systems And Methods To Simulate Preload For Fasteners Undergoing Rotation", filed Jan. 8, 2020. The contents of which are hereby incorporated by reference in its entirety for all purposes.

FIELD

The subject matter described herein relates to computer-aided engineering analysis (CAE), more particularly to systems and methods of simulating preload in fasteners undergoing rotation.

BACKGROUND

Industrial assembly can be a component or end item comprising of a number of parts or subassemblies put together to perform a specific function, and capable of disassembly without destruction. What may be an assembly at one point, however, may be a subassembly at another. Often, parts or subassemblies are connected together via fasteners. Fastener (e.g., nut, bolt, screw, captive threaded fastener, stud, threaded rod, etc.) is a hardware device that mechanically joins or affixes two or more object together. One of the most critical factors when it comes to reliability of a fastener is preload—the force the tightened fastener exerts on an industrial assembly. In other words, preload (i.e., pretension force, pre-torque moment, etc.) is a clamp load in a fastener after the fastener has been tightened. Preload is a function of many variables, including fastener material and finish, head style, and lubrication. Hence, there is no simple, totally reliable way to compute the precise preload needed for each application.

With advance of the computers, Computer Aided Engineering (CAE) analysis has been used for supporting engineers in many tasks. For example, figuring out proper amount of preload in a fastener, CAE analysis, particularly finite element analysis (FEA), has often been employed to evaluate responses (e.g., stresses, displacements, etc.) under various loading conditions (e.g., amount of preload).

FEA is a computer-implemented method widely used in industry to simulate (i.e., model and solve) engineering problems relating to complex products or systems such as three-dimensional linear and/or nonlinear structural design and analysis. FEA derives its name from the manner the geometry of the object under consideration is specified. The geometry is defined with nodal points connected by finite elements. There are many types of finite elements, solid finite elements for volumes or continua, shell or plane finite elements for surfaces, and beam or truss finite elements for one-dimensional objects.

Prior art approaches for simulating preload applied in a fastener have certain drawbacks, shortcomings and/or problems. For example, because preload is assumed to remain in the direction of original undeformed longitudinal axis of the fastener, prior art approaches can only be suitable for simulating a fastener under small rotation (within a couple of degrees) assumption.

SUMMARY

In one aspect of the disclosure, data characterizing an industry assembly connected with one or more fasteners received in a computer system. Each fastener is associated with a preload condition to be applied. The preload condition can include a pretension force or a pre-imposed axial displacement along the longitudinal axis of each fastener. The preload condition can also include a pre-torque moment or a pre-imposed torsional displacement about the longitudinal axis. A model representing a mechanism coupling a first portion and a second portion of the fastener is created. The first portion and the second portion are located respectively at either end of the fastener along a longitudinal axis of the fastener. The first portion and the second portion are axially displaceable along the axis towards each other via the mechanism and rotatably displaceable about the axis relative to each other via the mechanism. The model includes relative axial displacement and/or relative torsional displacement between the first portion and the second portion corresponding to the preload condition. Physical behaviors of the fastener applied with the preload condition is simulated based on the model. The mechanism contains a joint member having an axial translational degree-of-freedom and a torsional degree-of-freedom. A reference frame is assigned to the joint member.

In another aspect, the fastener is modeled with solid finite elements. The model includes a first part and a second part respectively representing the first portion and the second portion of the fastener. The first part includes a first set of nodes for representing a boundary between the first portion and the second portion. The second part includes a second set of nodes for representing the boundary.

The model creation method includes: A first control node in the first part is created for controlling the first set of nodes via a first force-distributed surface constraint. A second control node in the second part is created for controlling the second set of nodes via a second force-distributed surface constraint. Both first and second control nodes are located at the geometric center of the partition surface initially. Then the first control node and the second control node are connected to form a joint member. A first set of nodes are determined from the first part at the partition location. A partition surface can be defined by the first set of nodes. A first set of nodes are duplicated to create a second set of nodes in the second part at the partition location.

In yet another aspect, the fastener is modeled with three-dimensional beam finite elements. The model includes a first part and a second part respectively representing the first portion and the second portion of the fastener. The first portion and the second portion are adjacent to each other at a location along the longitudinal axis of the fastener. The first part includes a first beam node associated with the location, while the second part includes a second beam node associated with the location. The model creation method includes: connecting the first beam node and the second beam node to form a joint member. The first beam node is determined from the first part at the partition location and is duplicated to create a second beam node in the second portion at the partition location In still another aspect, simulated physical/structural behaviors of an industry assembly connected by one or more fasteners are obtained by applying the preload condition initially at each fastener via the numerical mechanism. Relative axial and/or relative torsional displacements may be kept unchanged in the joint member via a procedure (e.g., "lock function") to ensure the preload condition is maintained in the simulation. Simulated physical behaviors can be updated by applying one or more external loads subsequently in the simulation. Performance of each fastener can be evaluated using the simulated physical behaviors.

The disclosure includes a technique to provide a numerical mechanism that connects first and second portions of a fastener supporting large rotations and deformations. The longitudinal axis of a fastener is updated during the simulation following the deformed configuration. The simulation results (e.g., simulated physical behaviors) are then evaluated for detecting possible loosening or/and damage of each fastener, and for redesigning the fastener (e.g., with a different preload condition) if necessary.

Non-transitory computer-readable medium (i.e., physically embodied computer program products) is described that stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

System and methods are provided for a numerical mechanism via which a preload condition in a fastener is applied in a simulation. The preload condition can include a pretension force or a pre-imposed axial displacement along the longitudinal axis of the fastener. The preload condition can also include a pre-torque moment or a pre-imposed torsional displacement about the longitudinal axis. A model (e.g., a FEA model) representing a mechanism coupling a first portion and a second portion of the fastener is created. The first portion and the second portion are located respectively at either end of the fastener along a longitudinal axis of the fastener. The first portion and the second portion are axially displaceable along the axis towards each other via the mechanism and rotatably displaceable about the axis relative to each other via the mechanism. The model includes relative axial displacement and/or relative torsional displacement between the first portion and the second portion corresponding to the preload condition. Physical behaviors of the fastener applied with the preload condition is simulated based on the model.

The model includes a first part and a second part respectively representing the first portion and the second portion of the fastener. The first part includes a first set of nodes for representing a boundary between the first portion and the second portion. The second part includes a second set of nodes for representing the boundary.

A numerical mechanism is created to connect a first portion and a second portion of the fastener with a joint member. The portions are located at either end of the fastener along the longitudinal axis. The numerical mechanism facilitates the portions to move along the longitudinal axis of the fastener towards each other, and to rotate about the longitudinal axis against each other. A reference frame is assigned to the joint member such that a preload direction of the reference frame is initially aligned with the longitudinal axis, which is updated during a simulation of applying the preload condition to the fastener via the numerical mechanism.

Figure 1A:
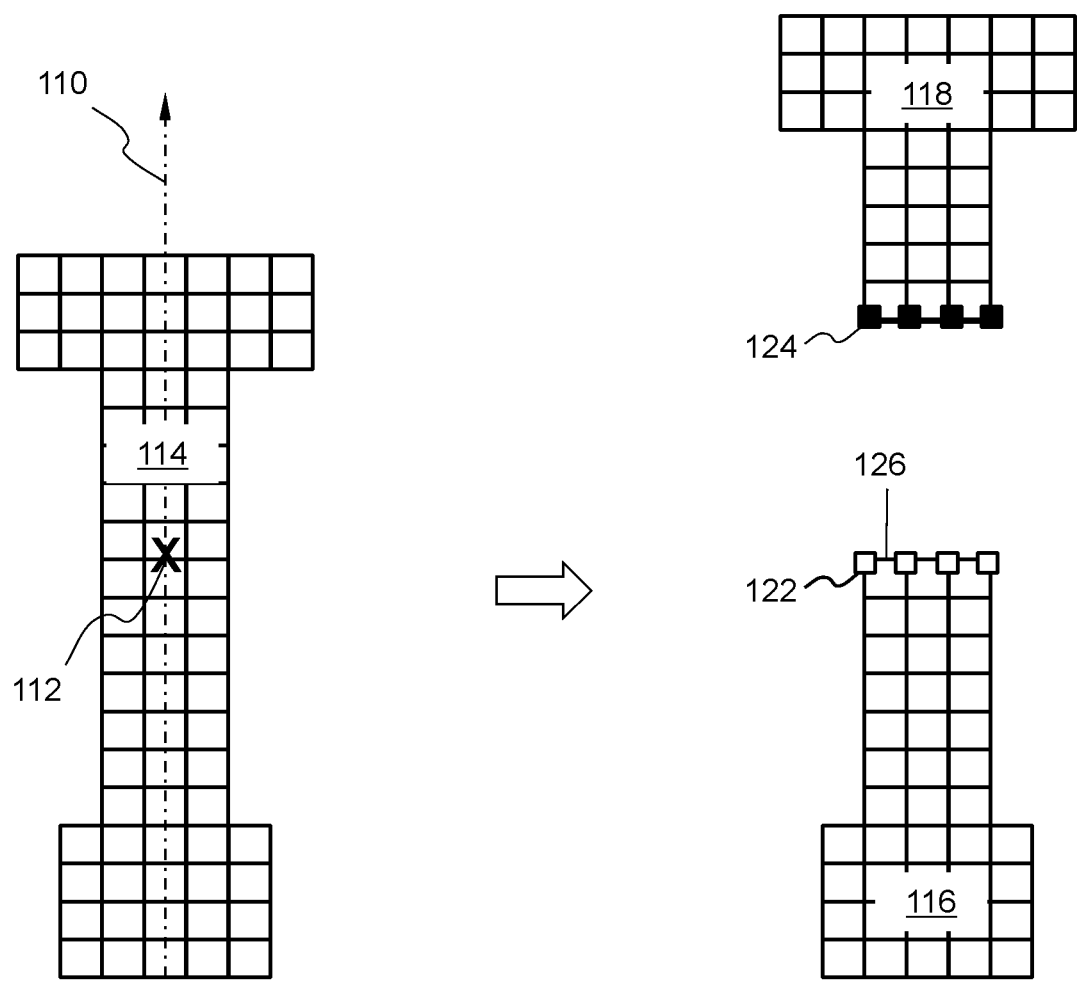
FIGS. 1A-1C are two-dimensional views illustrating various example FEA models of fastener.
Figure 1B:
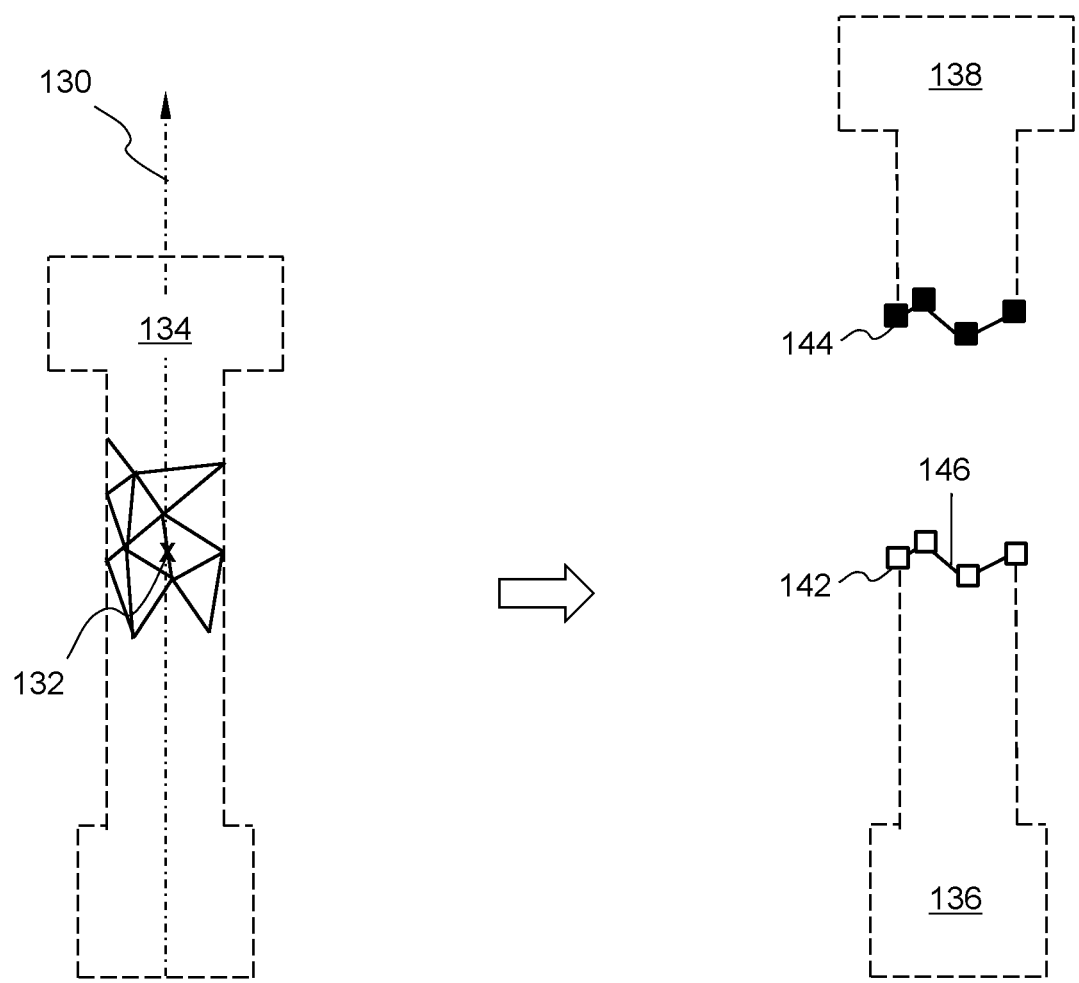
Figure 1C:
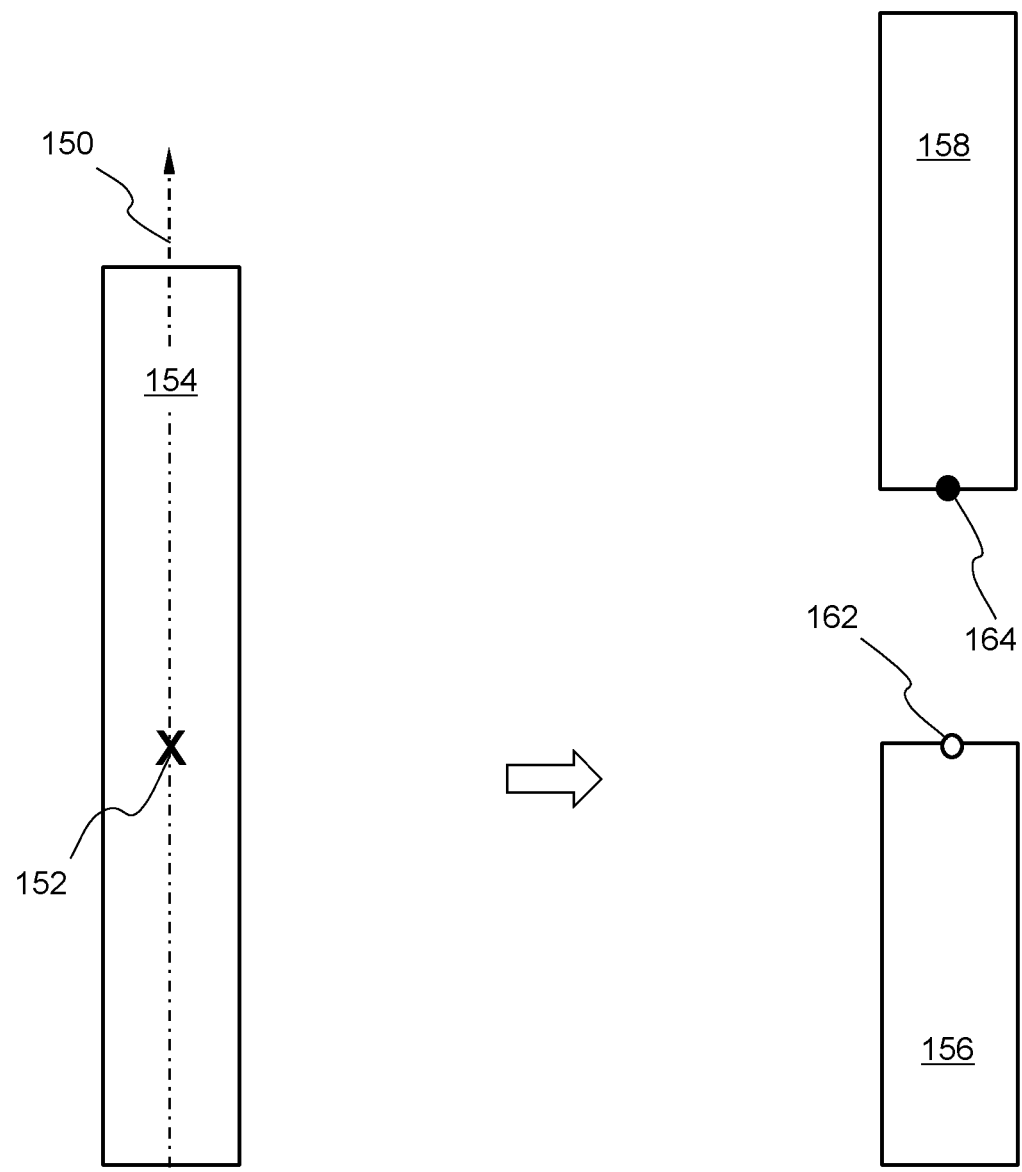

To demonstrate the creation of two opposite end portions (i.e., first and second portions) of a fastener, FIGS. 1A-1C illustrates various example finite element analysis (FEA) models of fasteners being divided into two parts. Each part represents corresponding portion of the fastener. For illustration simplicity and clarity, two-dimensional views are shown in FIGS. 1A-1C.

A first example FEA model 114 of a fastener (e.g., bolt) contains a number of nodes connected by a number of solid finite elements (e.g., hexahedral finite elements). The longitudinal axis 110 (i.e., bolt axis) is an axis defined by connecting two opposite ends of the fastener. In order to divide the FEA model 114 into a first part 116 and a second part 118, a partition location 112 (shown as "X") is first determined. The partition location 112 can be defined with many well known techniques. In one example, the partition location 112 can be defined/specified by a user of the computer software product of the subject matters described herein. In another example, the partition location 112 can be determined/assigned by the computer software product, for example, as a default value. The partition location 112 is located in substantially middle of the fastener 114 (e.g., half of the distance between two ends of the fastener).

As a result of the partition of the FEA model of the fastener 114, a first set of nodes 122 (shown as hollow squares) that define a partition surface 126 are determined from the first part 116. And the second part 118 contains a second set of nodes 124 (shown as solid squares) by duplicating the first set of nodes 122 at the partition location 112. The partition surface 126 is a flat surface as shown.

Substantially similar to the first example FEA model 114 shown in FIG. 1A, FIG. 1B shows a second example FEA model of a fastener 134 with the longitudinal axis 130 and a partition location 132 (shown as "X"). Instead of using a structured mesh of hexahedral solid finite elements, the second example model 134 is modeled with unstructured mesh of tetrahedral finite elements (shown as triangles). The fastener 134 is divided into a first part 136 and a second part 138. A first set of nodes 142 (shown as hollow squares) from the first part are determined at the partition location 132. A partition surface 146 is defined by the first set of nodes. A second set of nodes 144 (shown as solid squares) are created by duplicating the first set of nodes 142. Due to the unstructured mesh, the partition surface 146 has an uneven multi-faceted surface made of polygons (e.g., triangles). For those having ordinary skill in the art would recognize that FEA model can represent any complex geometry instead of the examples shown in FIGS. 1A-1B.

Instead of using solid finite elements to model a fastener, three-dimensional beam finite elements can be used the third FEA model 154 for a fastener shown in FIG. 1C. The longitudinal axis 150 connects two opposite ends of the fastener. A partition location 152 (shown as "X") is located in the middle section of the third FEA model 154. The third model 154 is divided into a first part 156 and a second part 158. A first beam node 162 (shown as a hollow circle) from the first part 156 is determined at the partition location 152. A second beam node 164 (shown as a solid circle) is created by duplicating the first beam node 162. In other words, both first beam node 162 and second beam node 164 are associated with the partition location 152.

Figure 2A:
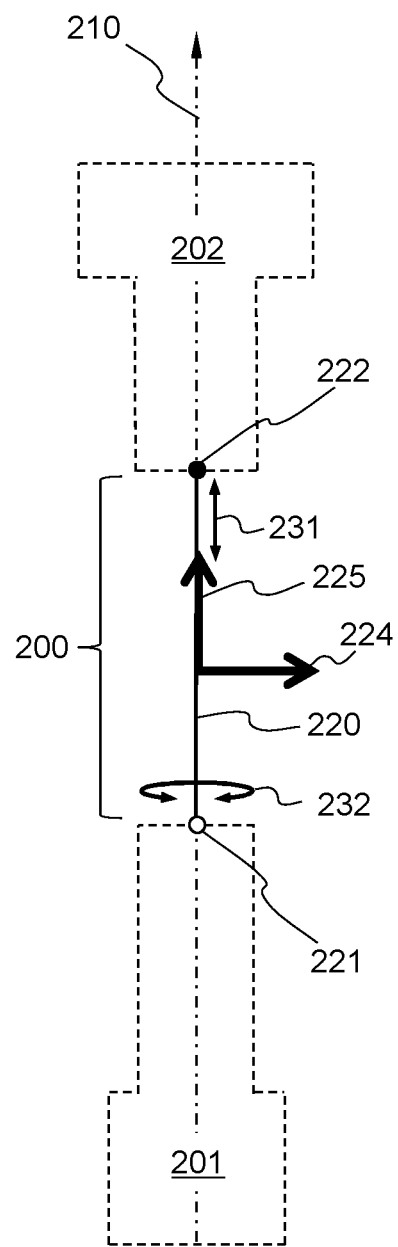
FIGS. 2A-2C are schematic diagrams showing an example numerical mechanism for applying a preload condition to a fastener.
Figure 2B:
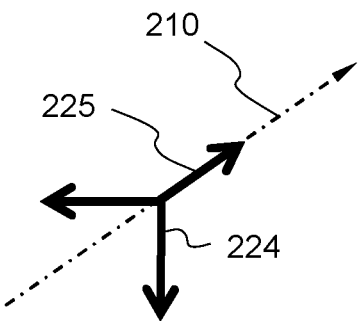
Figure 2C:
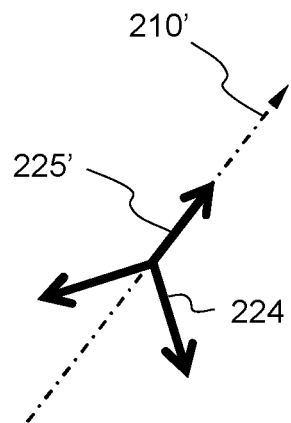

FIG. 2A shows an example numerical mechanism 200 for connecting a first portion 201 and a second portion 202 of a fastener, which has a longitudinal axis 210. The numerical mechanism 200 includes a joint member 220 to connect a first control node 221 and a second control node 222. The first control node 221 controls the first portion 201 through a first set of nodes (not shown) on the partition surface via a first force-distributed surface constraint. The second control node 222 controls the second portion 202 through a second set of nodes (not shown) on the partition surface via a second force-distributed surface constraint. The joint member 220 allows relative axial displacement 231 and relative torsional displacement 232 between two control nodes 221-222. A reference frame 224 is assigned to the joint member 220. One axis (preload direction 225) of the reference frame 224 is aligned with the longitudinal axis 210, which is updated during a simulation. In other words, the reference frame 224 along with the joint member 220 can be positioned to any orientation in a three-dimensional space. For example, FIG. 2B shows that a preload direction 225 of a reference frame 224 is aligned with the longitudinal axis 210 earlier in simulation (e.g., initial orientation). The reference frame 224' then moves to a new position with the preload direction 225' aligned with an updated direction of the longitudinal axis 210' later on in the simulation shown in FIG. 2C. The position or orientation of the longitudinal axis of the fastener is updated during a simulation. Such a feature can enable the fastener through the numerical mechanism to move to any orientation in a three-dimensional space in response to any loading condition including the preload condition.

In one embodiment, the reference frame can be a Cartesian coordinate system for a three-dimensional space having an origin initially located at the geometric center of the partition surface with one of the three orthogonal directions aligned with the longitudinal axis, while two other directions are perpendicular to the longitudinal axis. In another embodiment, the reference frame can be a cylindrical coordinate system (extended from a two-dimensional polar coordinate system) having an origin initially located at the geometric center of the partition surface with a chosen reference direction aligned with the longitudinal axis of the fastener.

The numerical mechanism 200 facilitates the first portion 201 and the second portion 202 to move towards each other along the longitudinal axis 210, and to rotate against each other about the axis 210. Since the first control node 221 and the second control node 222 coincide with each other at the same location initially, the joint member 220 has a zero length at the creation.

Terms used herein can have different names, for example, joint member 220 can be referred to as connection member, connection element, joint, and the likes. Numerical mechanism or mechanism 200 can be referred to as preload section, preload application section, preload application segment, preload application mechanism, etc. Control node 221-222 can be referred to as pilot node, master node, etc. Reference frame 224 can be referred to as a local coordinate system, a coordinate system, etc.

Figure 3A:
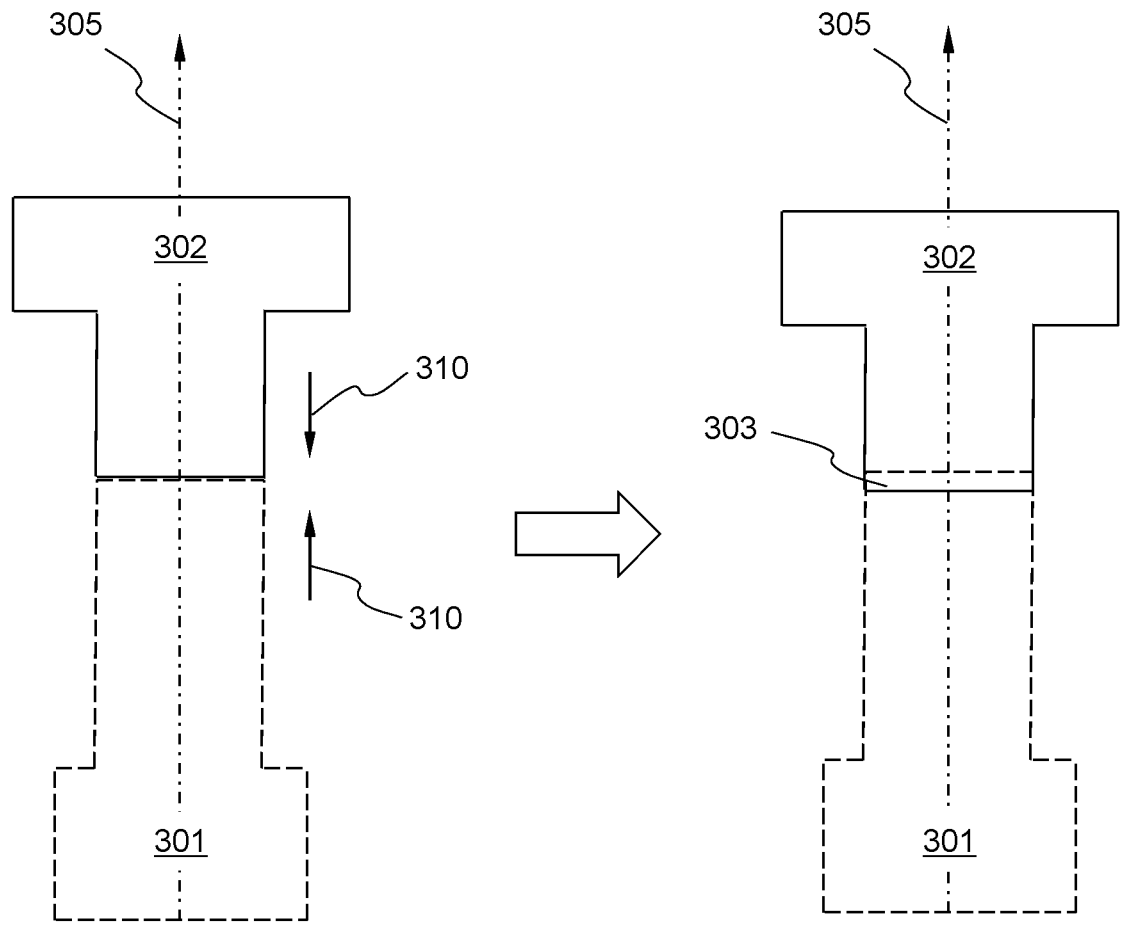
FIG. 3A is a schematic diagram illustrating an example relative axial displacement.

FIG. 3A shows that a relative axial displacement along the longitudinal axis 305 between a first portion 301 and a second portion 302 of a fastener under a pretension force 310. Overlapped section 303 is a result of applying the pretension force 310 or a pre-imposed axial displacement along the longitudinal axis 305 of a fastener. Numerical overlapped section 303 is resolved in a simulation when a force equilibrium is achieved.

Figure 3B:
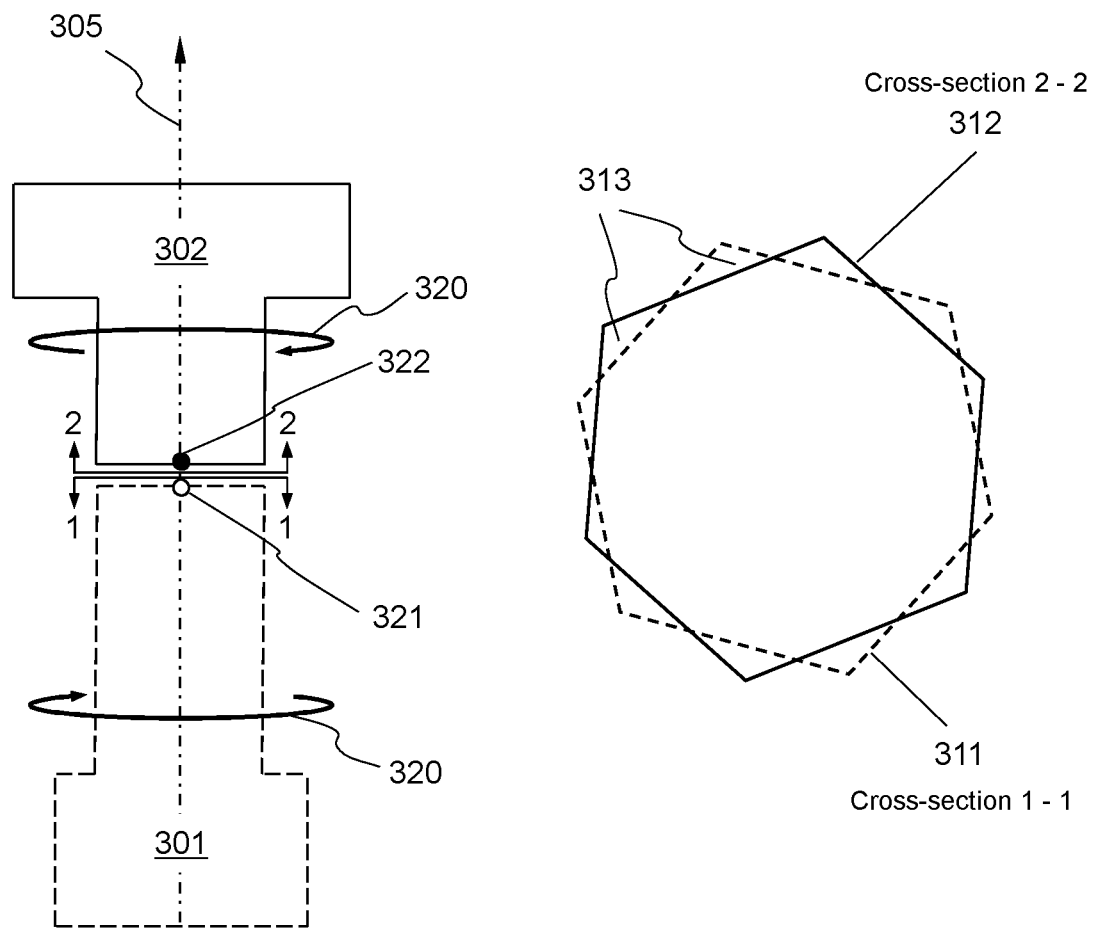
FIG. 3B is a schematic diagram illustrating an example relative torsional displacement.

FIG. 3B shows that a relative torsional displacement about the longitudinal axis 305 between a first portion 301 and a second portion 302 of a fastener under a pre-torque moment 320 or a pre-imposed torsional displacement at respective control nodes 321-322. Before the pre-torque 320 is applied, "Cross-section 1-1" 311 at the first control node 321 is the same as "Cross-section 2-2" 312 at the control node 322. In other words, the two cross-sections are coincided with each other as the two control nodes occupy a same location. After the pre-torque 320 has applied, the two cross-sections 311-312 rotate against each other as a result. Superimposing the two cross-sections 311-312 can result in some non-aligned regions 313. Numerical non-aligned regions 313 are resolved in a simulation when a force equilibrium is achieved.

Figure 4A:
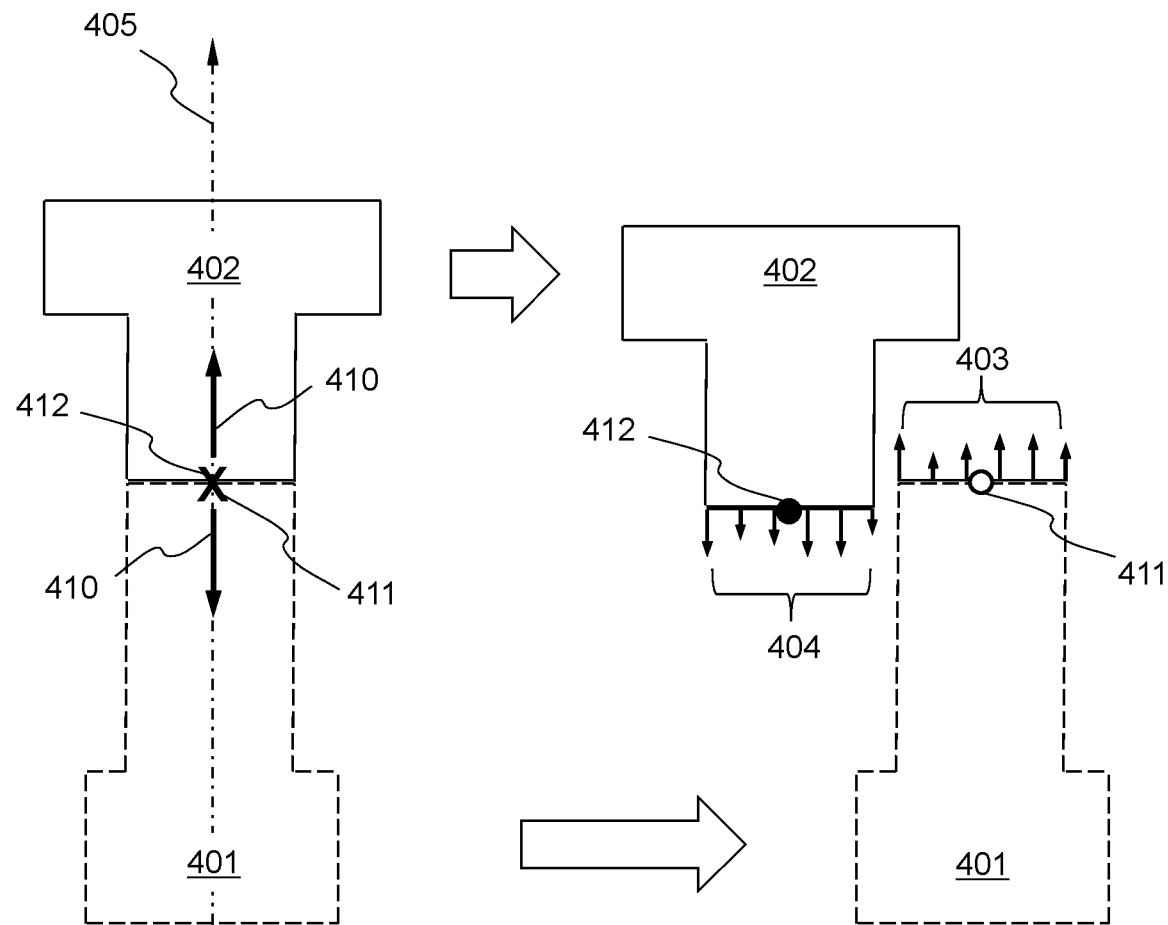
FIGS. 4A-4B are schematic diagrams showing example force-distributed surface constraint used in a numerical mechanism.

FIG. 4A shows an example force-distributed surface constraint for a control node to control a set of nodes subject to a pretension force. Shown in FIG. 4A, the first portion 401 and the second portion 402 of a fastener are pulled towards each other along the longitudinal axis 405 of a fastener by a pretension force 410 at first and second control nodes 411-412 (shown as an "X" due to two control nodes coinciding with each other initially). Pretension force 410 acted on the first control node 411 is distributed to nodal forces 403 applied to the first portion 401 via a first force-distributed surface constraint. The pretension force 410 acted on the second control node 412 is distributed to nodal forces 404 applied to the second portion 402 via a second force-distributed surface constraint.

Figure 4B:
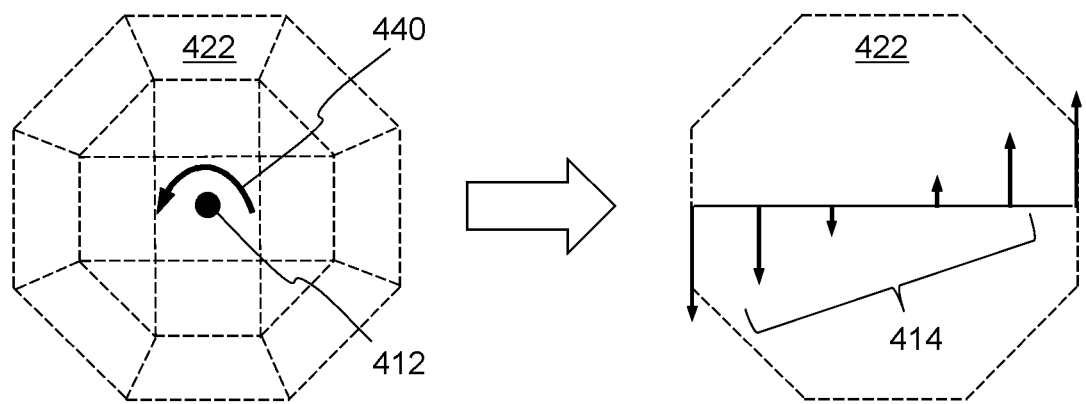
Figure 4B:
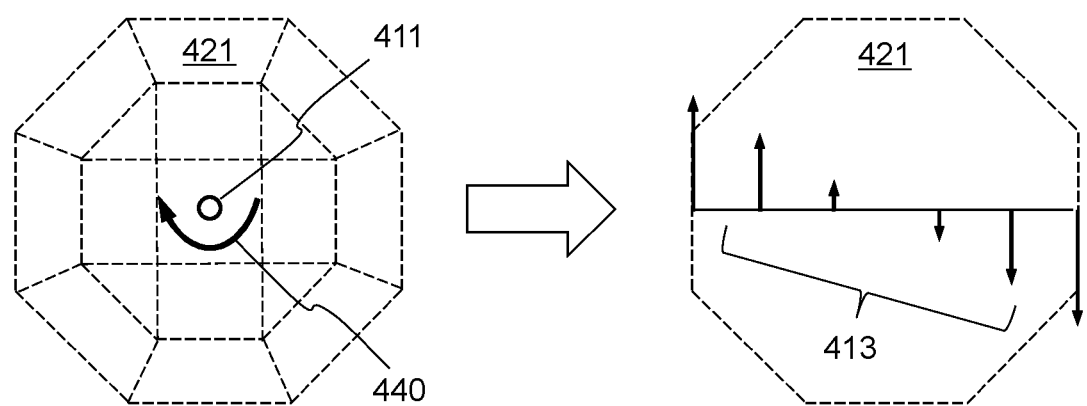

FIG. 4B shows an example force-distributed surface constraint for a control node to control a set of nodes subject to a pre-torque. The cross-section 421 of the first portion 401 at the first control node 411 and the cross-section 422 of the second portion 402 at the second control node 412 of a fastener are shown in FIG. 4B. The portions 401-402 are rotated against each other about the longitudinal axis 405 (not shown) by a pre-torque moment 440 at the first and second control nodes 411-412. Pre-torque moment 440 acted on the first control node 411 is distributed to nodal forces 413 applied to the first portion 401 via the first force-distributed surface constraint. The pre-torque moment 440 acted on the second control node 412 is distributed to nodal forces 414 applied to the second portion 402 via the second force-distributed surface constraint. The pattern of nodal forces can be complicated, the example shown in FIGS. 4A-4B is for illustration simplicity. Those having ordinary skill in the art would appreciate actual nodal forces due to torque moment can be complex to illustrate. A force-distributed surface constraint can be used for distributing forces and/or moments (e.g., pretension force and/or pre-torque moment). When the preload condition is pre-imposed axial displacement and/or torsional displacement, the force-distributed surface constraint can also distribute them accordingly.

In one embodiment, distribution of forces or imposed displacements from a control node to a set of nodes is achieved with through respective shape functions of finite elements in an average sense. Each finite element in the FEA model is then deformed by the nodal forces at the set of nodes.

Figure 5:
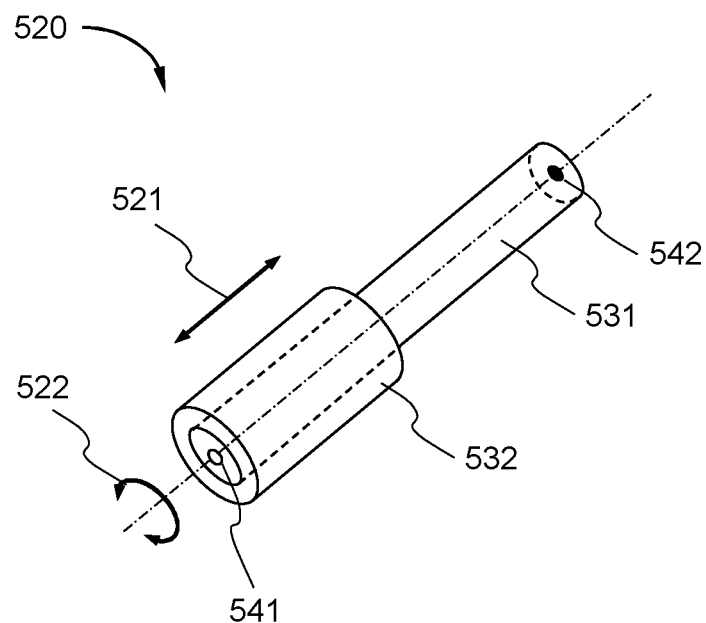
FIG. 5 is a diagram illustrating example joint members.
Figure 5:
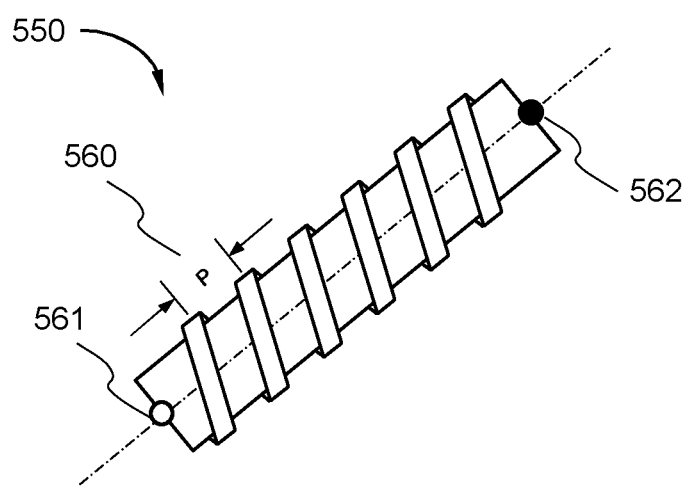

Two example joint types shown in FIG. 5 can each represent a joint member in a numerical mechanism. First example joint member 520 contains two concentric cylinders with an inner cylinder 531 and an outer ring cylinder 532 between two control or beam nodes 541-542. Relative axial displacement 521 and relative torsional displacement 522 are achieved by moving the outer ring cylinder 532 against the inner cylinder 531 in the respective displacement directions. Two cylinders shown herein are for explaining the structural of a joint member, i.e., joint member contains two control or beam nodes with two relative displacements between the two nodes without cylindrical structure. As shown, the first example joint member 520 can be used for simulating pretension force and/or pre-torque moment.

Second example joint member 550 emulates a screw joint with a pitch-to-rotation relationship between two control or beam nodes 561-562. Pitch "P" 560 is in proportion to an amount of rotations. Pre-imposed axial displacement equals to the amount of pitch (e.g., half of a pitch), which can be converted to amount of rotational displacement from the pitch-to-rotation relationship. The screw joint can be used only for simulating pretension force in the preload condition.

Figure 6A:
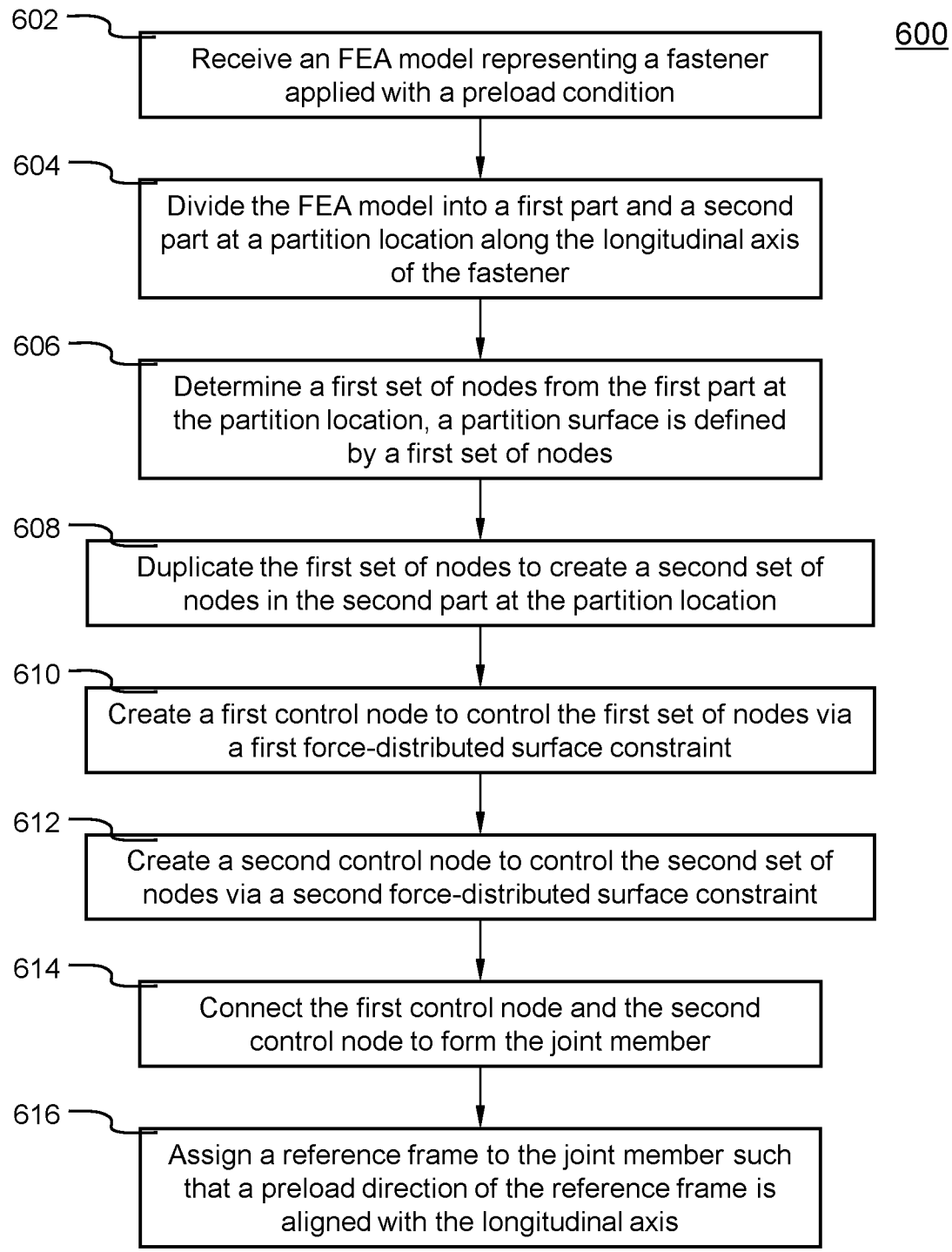
FIGS. 6A-6B are flowcharts illustrating example processes of creating a numerical mechanism for applying a preload condition to a fastener.

FIG. 6A is a flowchart illustrating an example process 600 of creating a numerical mechanism in an FEA model of a fastener to be applied with a preload condition, when the fastener is modeled with solid finite elements.

Process 600 starts at action 602 by receiving an FEA model representing a fastener to be applied with a preload condition. The fastener can be one of many fasteners in an industry assembly. The preload condition can contain a pretension force or a pre-imposed axial displacement along the longitudinal axis of the fastener. The preload condition can also contain a pre-torque moment or a pre-imposed torsional displacement about the longitudinal axis.

At action 604, the FEA model of the fastener is divided into a first part and a second part at a partition location along the longitudinal axis of the fastener. Various example fasteners being divided into two portions are shown in FIGS. 1A-1B.

At action 606, a first set of nodes from the first part are determined at the partition location. A partition surface can be defined by the first set of nodes. Next, at action 608, the first set of nodes are duplicated to create a second set of nodes in the second part at the partition location.

Next, at action 610, a first control node is created to control the first set of nodes via a first force-distributed surface constraint. At action 612, a second control node is created to control the second set of nodes via a second force-distributed surface constraint. Both the first control node and the second control node are located at the geometric center of the partition surface. The partition surface is also referred to as a boundary between the first portion and the second portion. FIGS. 4A-4B show an example force-distributed surface constraint.

At action 614, the first control node and the second control node are connected to form the joint member. In other words, the control nodes are located at either end of the joint member. The preload condition is applied via the joint member and the control nodes to the parts of the fastener via respective force-distributed surface constraints through nodes controlled by the control nodes. Finally, at action 616, a reference frame (e.g., a local coordinate system) is assigned to the joint member such that a direction of the reference frame is aligned with the longitudinal axis of the fastener as the preload direction. The position or orientation of the longitudinal axis of the fastener is updated during a simulation. Such a feature can enable the fastener through the numerical mechanism to move to any orientation in a three-dimensional space in response to any loading condition including the preload condition. FIG. 2A shows an example numerical mechanism.

Figure 6B:
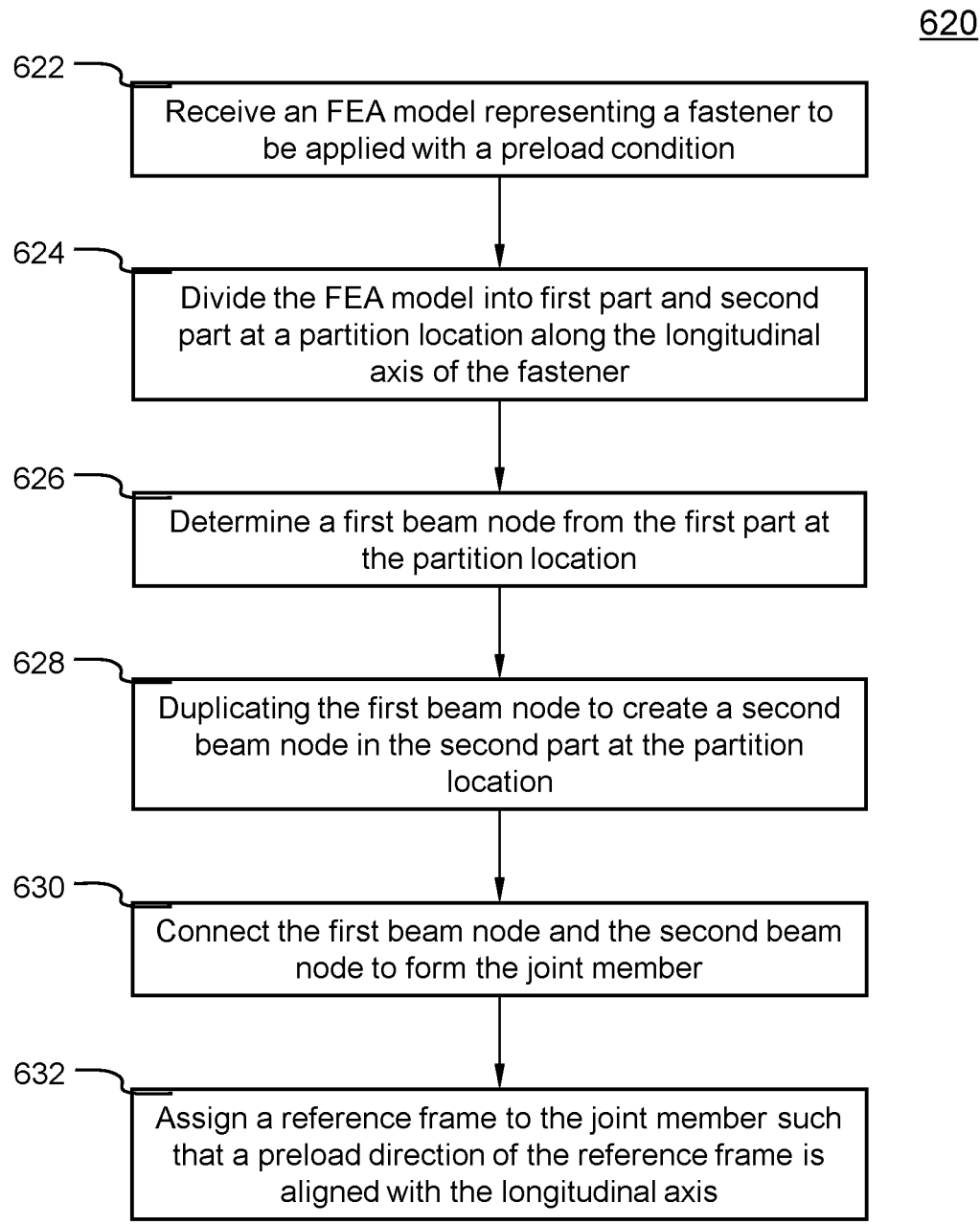

For a fastener modeled with three-dimensional beam finite elements in the FEA model, an example numerical mechanism creation process 620 is shown in FIG. 6B. Process 620 starts action 622 by receiving an FEA model of a fastener to be applied with a preload condition. Next, at action 624, the FEA model representing a fastener is divided into a first part and a second part at a partition location along the longitudinal axis of the fastener. Then, at action 626, a first beam node from the first part is determined at the partition location. At action 628, the first beam node is duplicated to create a second beam node at the partition location. At action 630, the first beam node and the second beam node are connected to form the joint member. In other words, first and second beam nodes are located at either end of the joint member, which has a zero length initially because the first beam node and the second beam node are located at the same position. Finally, at action 632, a reference frame (e.g., a local coordinate system) is assigned to the joint member such that the preload direction of the reference frame is initially aligned with the longitudinal axis of the fastener. An example fastener modeled with three-dimensional beam finite elements is shown in FIG. 1C.

Figure 7:
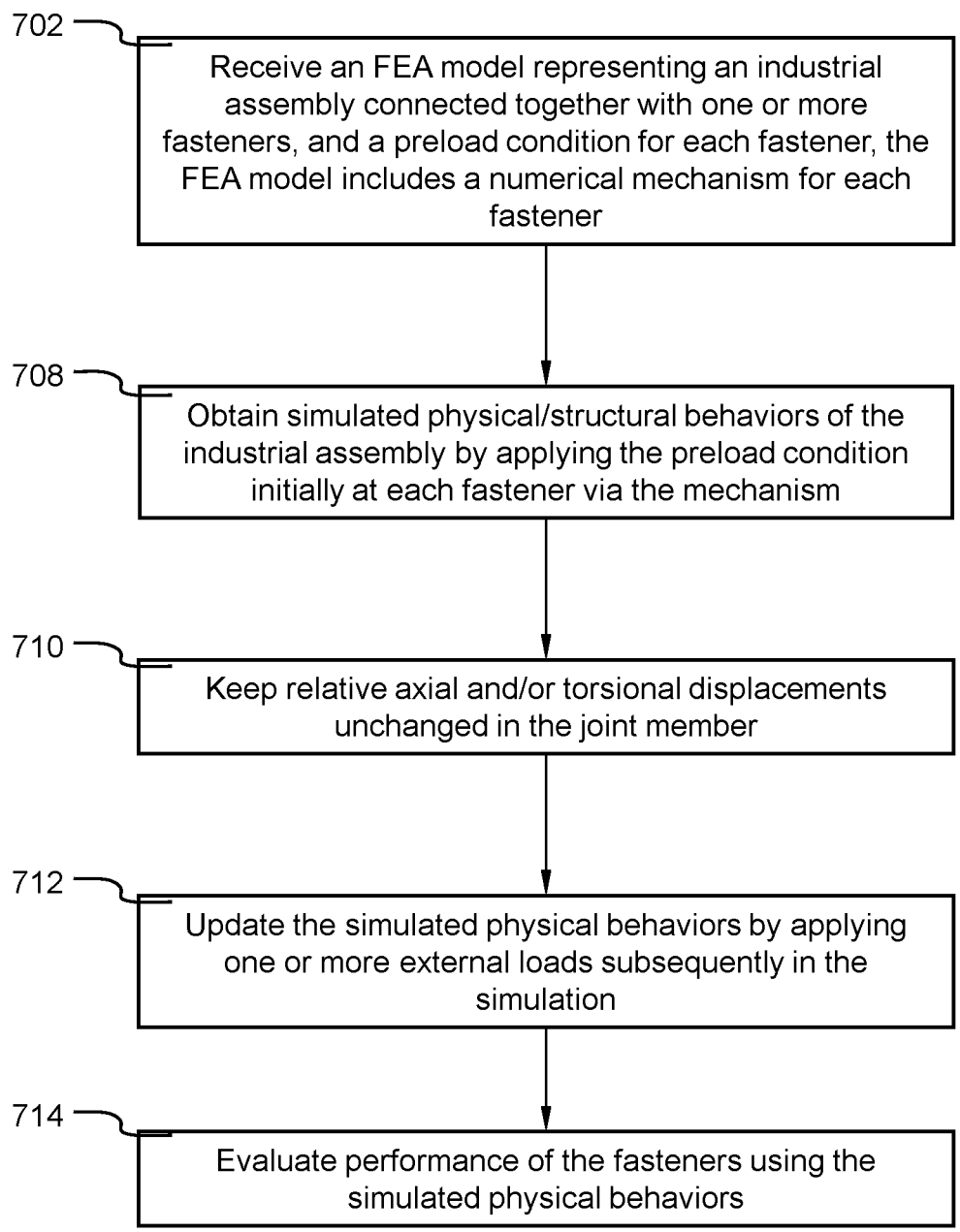
FIG. 7 is a flowchart illustrating an example process of performance evaluation of a fastener in a simulation including a preload condition applied to a fastener.

FIG. 7 is a flowchart showing an example process 700 of evaluating performance of a fastener in a simulation that includes a preload condition applied to the fastener. Process 700 starts at action 702 by receiving an FEA model in a computer system (e.g., a computer system shown in FIGS. 8A-8B). The FEA model represents an industrial assembly connected with one or more fasteners. Each fastener is associated with a preload condition to be applied.

The FEA model includes a numerical mechanism in each fastener for applying the preload condition. The numerical mechanism is created to connect first and second portions of the fastener with a joint member. The portions are located at either end of the fastener along the longitudinal axis. The numerical mechanism facilitates the portions to move along the longitudinal axis towards each other and/or to rotate about the longitudinal axis against each other. Creation of such a numerical mechanism can be performed before a simulation, for example, a preprocessing process of creating an FEA model of the fastener.

Next, at action 708, simulated physical/structural behaviors of the industrial assembly are obtained by applying the preload condition initially at each fastener via the numerical mechanism in a simulation (e.g., FEA). For example, a finite element analysis of the industrial assembly is performed to simulate application of the preload condition to each fastener contained therein. The preload condition can include a pretension force or a pre-imposed axial displacement along the longitudinal axis of the fastener. The preload condition can also include a pre-torque moment or a pre-imposed torsional displacement about the longitudinal axis.

The reference frame of the joint member in the mechanism is updated in a simulation (e.g., nonlinear static analysis) at each iteration of a load increment or load step. Displacements of two ends of the joint member (i.e., control nodes or beam nodes) are calculated and updated in each iteration hence the reference frame is updated accordingly. Such an update allows the fastener to move about in a three-dimensional space. As a result, any finite torsional displacement of a fastener can be achieved.

Then, at action 710, relative axial and/or torsional displacements (i.e., part of the obtained simulated physical behaviors initially) are kept unchanged in the joint member after the preload condition has been applied to each fastener. This may be achieved with a "lock function" to lock or freeze the calculated displacements in the joint member. The calculated displacements are part of the simulated physical behaviors at the respective control nodes or beam nodes that form the joint member. In other words, relative axial displacement along the longitudinal axis and/or relative torsional displacement about the longitudinal axis of each fastener are kept unchanged or constant after the simulated physical behaviors have been obtained.

In one embodiment, the application of a preload condition to each fastener is performed simultaneously. In another embodiment, the application of a preload condition to each fastener is performed sequentially (e.g., a sequence specified by a user). For example, applying different portions/amounts of a preload condition in a specific sequence can be used for simulating a process requiring bolts to be tighten in a specific sequence defined by user.

Then, at action 712, simulated physical behaviors may be updated by applying one or more external loads subsequently in the simulation. Finally, at action 714, performance of the fasteners can be evaluated using the simulated structural/physical behaviors. The performance of the fasteners may include loosening, structural damage, etc.

The subject matter described herein may be implemented using any suitable processing system with any suitable combination of hardware, software and/or firmware, such as described below with reference to the non-limiting examples shown in FIGS. 8A-8C.

Figure 8A:
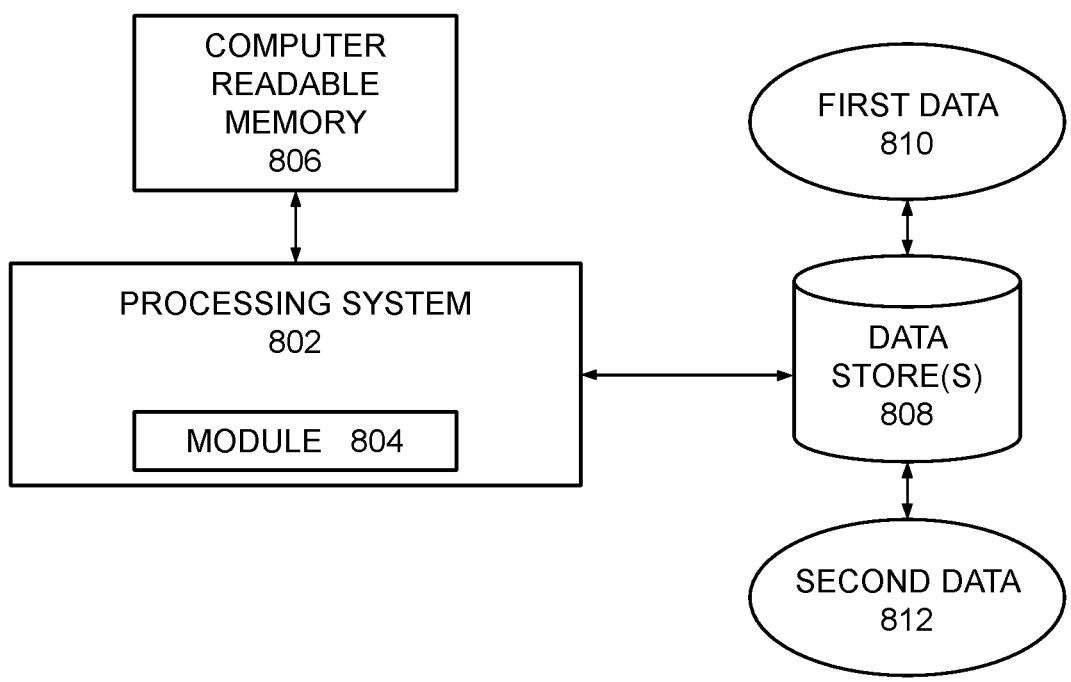
FIG. 8A is a block diagram showing an example system including a standalone computing architecture.

FIG. 8A depicts an example system 800 that includes a standalone computer architecture where a processing system 802 (e.g., one or more computer processors) includes a module 804 (e.g., software module stored in memory) being executed on it. The processing system 802 has access to a non-transitory computer-readable memory 806 in addition to one or more data stores 808. The one or more data stores 808 may contain first data 810 as well as second data 812.

Figure 8B:
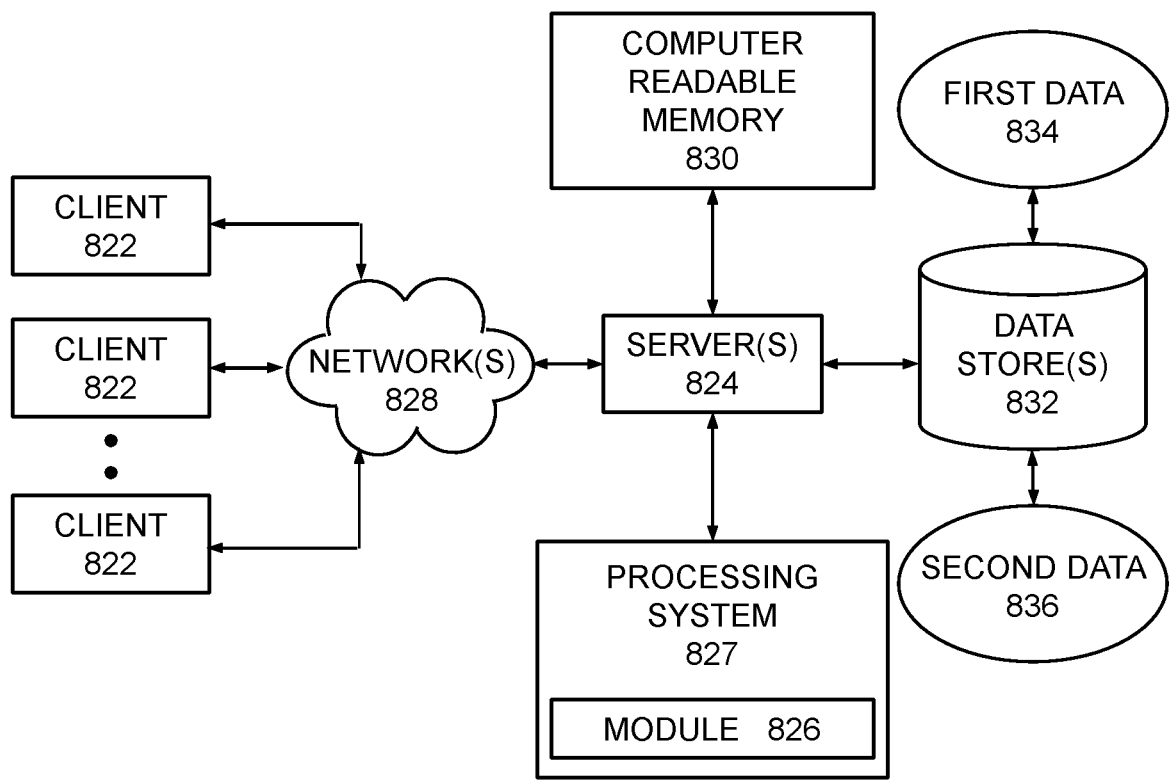
FIG. 8B is a block diagram showing an example system including a client-server computing architecture.

FIG. 8B depicts another example system 820 that includes a client-server architecture. One or more clients 822 (e.g., user personal computer, workstation, etc.) accesses one or more servers 824 executing computer instructions of a module 826 (e.g., software module stored in memory) on a processing system 827 via one or more networks 828. The one or more servers 824 may access a non-transitory computer readable memory 830 as well as one or more data stores 832. The one or more data stores 832 may contain first data 834 as well as second data 836.

Figure 8C:
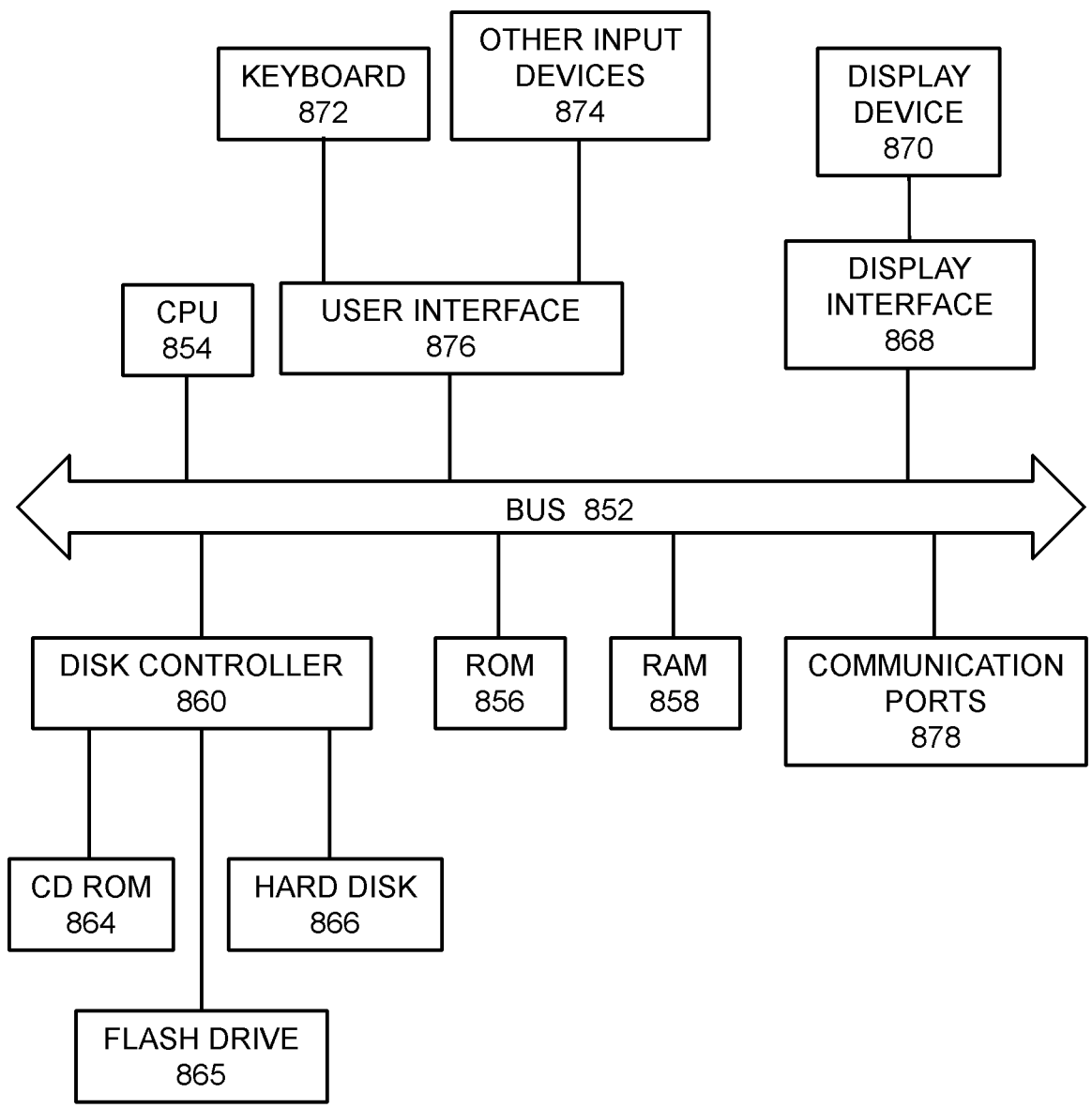
FIG. 8C is a function block diagram showing salient components of an example computing device for implementing the subject matters described herein.

FIG. 8C shows a function block diagram of example hardware for a standalone computer architecture 850, such as the architecture depicted in FIG. 8A, that may be used to contain and/or implement the subject matter described herein. A bus 852 may serve as the information highway interconnecting the other illustrated components of the hardware. A processing system 854 labeled CPU (central processing unit) (e.g., one or more computer processors), may perform calculations and logic operations required to execute a program/software/module. A non-transitory computer-readable storage medium, such as read only memory (ROM) 856 and random access memory (RAM) 858, may be in communication with the processing system 854 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 878.

A disk controller 860 interfaces one or more optional disk drives to the system bus 852. These disk drives may be external or internal flash memory drives 865, external or internal CD-ROM, CD-R, CD-RW or DVD drives 864, or external or internal hard disk drives 866. As indicated previously, these various disk drives and disk controllers are optional devices.

If needed, the processor 854 may access each of the following components: real-time data buffer, conveyors, file input processor, database index shared access memory loader, reference data buffer and data managers. Each component may include a software application stored in one or more of the disk drives connected to the disk controller 860, the ROM 856 and/or the RAM 858.

A display interface 868 may permit information from the bus 852 to be displayed on a display 870 in audio, video, graphic, text, or alphanumeric format.

In addition to the standard computer-type components, the hardware may also include data input devices, such as a keyboard 872, or other input device 874, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas the cross-section of a fastener has been shown and described to be regular convex polygons, the cross-section can have other shapes, for example, irregular convex polygons, regular or irregular concave polygons. Additionally, whereas a preload condition has been shown and described as being applied to each fastener before one or more external loads, the preload condition can be intermittently applied with one or more external loads in certain situations still within the scope of the subject matter disclosed herein. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method for providing a digital computer simulation for characterizing preload in fasteners undergoing rotation comprising:

receiving, by a computer aided engineering (CAE) program, a finite element analysis (FEA) model of a plurality of fasteners and a corresponding preload condition applied to each of the plurality of fasteners;

initializing, by the CAE program, the FEA model, wherein for each of the plurality of fasteners: the FEA model represents a mechanism coupling a first portion and a second portion of the fastener, the first portion and the second portion are located respectively at either end of the fastener along a longitudinal axis of the fastener, the first portion and the second portion are each axially displaceable along the axis towards each other via the mechanism and are each rotatably displaceable about the axis relative to each other via the mechanism, the FEA model defines a joint member connecting the first portion and the second portion, the joint member has both of an axial translational degree-of-freedom for relative axial displacement and a torsional degree-of-freedom for relative torsional displacement between the first portion and the second portion corresponding to the preload condition, the FEA model includes a first part and a second part respectively representing the first portion and the second portion, the first part includes a first set of nodes for representing a boundary between the first portion and the second portion, the second part includes a second set of nodes for representing the boundary, a first control node is created in the first part to control the first set of nodes via a first force-distributed surface constraint, a second control node is created in the second part to control the second set of nodes via a second force-distributed surface constraint and the first control node and the second control node are connected to form the joint member; and simulating, by the CAE program, physical behaviors of each of the plurality of fasteners applied with the corresponding preload condition in a nonlinear structural FEA based on the FEA model, the simulating comprising, for each fastener, updating a reference frame of the joint member of a load increment of the corresponding preload condition in the nonlinear structural FEA from an initial alignment with the longitudinal axis when applying the corresponding preload condition to the fastener via the mechanism and applying a lock function to lock or freeze calculated displacements in the joint member;

wherein the simulating applies the corresponding preload conditions to each of the plurality of fasteners in a sequence for simulating a process requiring the fasteners to be tightened according to the sequence to detect nonlinear physical behavior causing loosening or damage to at least one of the plurality of fasteners.

2. The method of claim 1, wherein for each of the plurality of fasteners: the preload condition includes a pretension force or a pre-imposed axial displacement along the respective axis.

3. The method of claim 1, wherein for each of the plurality of fasteners: the preload condition includes a pre-torque moment or a pre-imposed torsional displacement about the respective axis.

4. The method of claim 1, wherein the FEA model for the at least one of the fasteners comprises solid finite elements.

5. The method of claim 1, wherein for each of the plurality of fasteners: the second control node is created by duplicating the first control node.

6. The method of claim 1, wherein for each of the plurality of fasteners: the first control node and the second control node initially coincide with each other at a geometric center of a surface defined by the first set of nodes.

7. The method of claim 6, wherein the surface comprises a flat area.

8. The method of claim 6, wherein the surface comprises an uneven multi-faceted area.

9. The method of claim 1, wherein for each of the plurality of fasteners: the joint member emulates a joint allowing the relative axial displacement and/or the torsional displacement.

10. The method of claim 1, wherein for each of the plurality of fasteners: the joint member emulates a screw joint using a pitch-to-rotation relationship.

11. The method of claim 1, wherein the FEA model for the at least one of the fasteners comprises three-dimensional beam finite elements.

12. The method of claim 11, wherein for each of the plurality of fasteners: the first portion and the second portion are adjacent to each other at a location along the axis, wherein the first part includes a first beam node associated with the location, and wherein the second part includes a second beam node associated with the location, said initializing the FEA model comprising: connecting the first beam node and the second beam node to form the joint member.

13. The method of claim 12, wherein the joint member emulates a joint allowing the relative axial displacement and/or the relative torsional displacement.

14. The method of claim 12, wherein the joint member emulates a screw joint using a pitch-to-rotation relationship.

15. The method of claim 1, wherein the simulation comprises: keeping the relative axial and/or torsional displacements unchanged in the mechanism for the at least one of the fasteners.

16. The method of claim 15, further comprises: applying one or more additional external loads.

17. The method of claim 16, further comprising:
evaluating performance of the plurality of fasteners using the physical behaviors; and
redesigning the at least one of the fasteners with a different preload condition based on the evaluating.

18. A system for providing a digital computer simulation for characterizing preload in fasteners undergoing rotation comprising:
a memory storing instructions;
one or more processors coupled to the memory, the one or more processors executing the instructions from the memory to perform a method comprises:
receiving, by a computer aided engineering (CAE) program, a finite element analysis (FEA) model of fastener and a preload condition applied to the fastener;
initializing, by the CAE program, the FEA model, the FEA model representing a mechanism coupling a first portion and a second portion of the fastener at a partition surface, the first portion and the second portion located respectively at either end of the fastener along a longitudinal axis of the fastener, and the first portion and the second portion each axially displaceable along the axis towards each other via the mechanism and each rotatably displaceable about the axis relative to each other via the mechanism, the FEA model defining a joint member connecting the first portion and the second portion, the joint member having both of an axial translational degree-of-freedom for relative axial displacement and a torsional degree-of-freedom for relative torsional displacement between the first portion and the second portion corresponding to the preload condition, the FEA model including a first part and a second part respectively representing the first portion and the second portion, the first part including a first set of nodes for representing a boundary between the first portion and the second portion, the second part including a second set of nodes for representing the boundary, the initializing further comprising:
creating a first control node in the first part to control the first set of nodes via a first force-distributed surface constraint;
creating a second control node in the second part to control the second set of nodes via a second force-distributed surface constraint; and
connecting the first control node and the second control node to form the joint member;
simulating, by the CAE program, physical behaviors of the fastener applied with the preload condition in a nonlinear structural FEA based on the FEA model, the simulating comprising updating a reference frame of the joint member of a load increment of the preload condition in the nonlinear structural FEA from an initial alignment with the longitudinal axis for enabling nonlinear physical behaviors of the fastener and applying a lock function to lock or freeze calculated displacements in the joint member, and wherein the simulated physical behaviors of the fastener applied with the preload condition are used in detecting possible loosening and/or damage of the fastener;
redesigning the fastener with a different preload condition based on the simulating;
wherein:
the first control node controls the first portion through the first set of nodes using the first force-distributed surface constant;
the second control node controls the second portion through the second set of nodes using the second force-distributed surface constant;
wherein the simulating applies the preload conditions to each of the fasteners in a sequence for simulating a process requiring the fasteners to be tightened according to the sequence to detect nonlinear physical behavior causing loosening or damage to at least one of the fasteners.

19. A computer-implemented method for characterizing preload in fasteners undergoing rotation comprising:
receiving, by a computer aided engineering (CAE) program, a finite element analysis (FEA) model of fastener and a preload condition applied to the fastener, the FEA model comprising solid finite elements;
initializing, by the CAE program, the FEA model, wherein for each of a plurality of fasteners: the FEA model represents a mechanism coupling a first portion and a second portion of the fastener, the first portion and the second portion are located respectively at either end of the fastener along a longitudinal axis of the fastener, the first portion and the second portion are each axially displaceable along the axis towards each other via the mechanism and are each rotatably displaceable about the axis relative to each other via the mechanism, the FEA model defines a joint member connecting the first portion and the second portion, the joint member has both of an axial translational degree-of-freedom for relative axial displacement and a torsional degree-of-freedom for relative torsional displacement between the first portion and the second portion corresponding to the preload condition, the FEA model includes a first part and a second part respectively representing the first portion and the second portion, the first part includes a first set of nodes for representing a boundary between the first portion and the second portion, the second part includes a second set of nodes for representing the boundary, a first control node is created in the first part to control the first set of nodes via a first force-distributed surface constraint, a second control node is created in the second part to control the second set of nodes via a second force-distributed surface constraint and the first control node and the second control node are connected to form the joint member; and simulating, by the CAE program, physical behaviors of each of the fasteners applied with the corresponding preload condition in a nonlinear structural FEA based on the FEA model, the simulating comprising, for each fastener, updating a reference frame of the joint member of a load increment of the corresponding preload condition in the nonlinear structural FEA from an initial alignment with the longitudinal axis for enabling nonlinear physical behaviors of the fastener and applying a lock function to lock or freeze calculated displacements in the joint member; and redesigning at least one of the fasteners with a different preload condition based on the simulating;

wherein the simulating applies the corresponding preload conditions to each of the fasteners in a sequence for simulating a process requiring the fasteners to be tightened according to the sequence to detect nonlinear physical behavior causing loosening or damage to the at least one of the fasteners.

* * * * *